United States Patent [19]

Roth

[11] 3,810,026

[45] May 7, 1974

[54] DUTY FACTOR CORRECTION CIRCUIT

[75] Inventor: Stephen A. Roth, Beaverton, Oreg.

[73] Assignee: Tektronix, Inc., Beaverton, Oreg.

[22] Filed: May 29, 1973

[21] Appl. No.: 364,228

Related U.S. Application Data

[63] Continuation of Ser. Nos. 194,064, Oct. 29, 1971, abandoned, and Ser. No. 809,140, March 21, 1969, abandoned.

[52] U.S. Cl. ................. 328/127, 328/150, 307/228, 307/237

[51] Int. Cl. ........................................... H03k 17/00

[58] Field of Search ........... 307/260, 228, 229, 237; 328/127, 128; 235/185

[56] References Cited

UNITED STATES PATENTS

| | | | |
|---|---|---|---|
| 3,322,973 | 5/1967 | Baldwin | 307/228 |
| 3,564,298 | 2/1971 | Colino | 307/237 |

FOREIGN PATENTS OR APPLICATIONS

| | | |
|---|---|---|
| 4,185 | 1/1964 | Great Britain |

*Primary Examiner*—Rudolph V. Rolinec
*Assistant Examiner*—B. P. Davis
*Attorney, Agent, or Firm*—Klarquist, Sparkman, Campbell, Leigh, Hall & Whinston

[57] ABSTRACT

A limiter circuit receives a distorted or unsymmetrical input signal, and in response thereto produces a rectangular current waveform. The rectangular current waveform is applied to an integrating means for generating a triangular waveform, the average value of which divides such triangular waveform into equal time intervals. This triangular waveform is a.c. coupled to a second limiter circuit which provides an output waveform characterized by a fifty percent duty factor.

15 Claims, 3 Drawing Figures

STEPHEN A. ROTH
*INVENTOR*

*BY*

*BUCKHORN, BLORE, KLARQUIST & SPARKMAN*
*ATTORNEYS*

DUTY FACTOR CORRECTION CIRCUIT

This is a continuation, of application Ser. No. 194,064 filed Oct. 29, 1971 and Ser. No. 809,140, filed Mar. 21, 1969, now abandoned.

BACKGROUND OF THE INVENTION

There are many instances in complex electronic circuitry wherein a signal becomes distorted because of load demand made thereupon or for other reasons. Such a signal may exhibit harmonic distortion and have a waveform which is unsymmetrical timewise with respect to its zero axis or average value. For some purposes, it is desirable, if not essential, that a given waveform be symmetrical or have a duty factor of 50 percent, as when such waveform is employed for switching purposes. One instance wherein a 50 percent duty factor is desired is in the operation of a balanced modulator or synchronous detector. An unsymmetrical signal employed as a carrier in this type of device results in the improper generation or detection of sideband information.

A popular circuit for correcting the duty factor of input waveform includes an LC circuit tuned to the frequency of the input waveform, having a reasonably high Q. Such a circuit will provide the needed correction for the distorted waveform by producing a sine wave of the specified frequency having a fifty percent duty factor. However, this type of circuit is effective principally at its resonant frequency, and must be adjusted if the signal frequency is changed. Moreover, if the Q of the circuit is such as to provide appreciable correction, a phase shift is introduced which can vary as the circuit is adjusted, or as the frequency changes. Even if such a circuit is to be employed only at one frequency, capacitance and inductance elements as well as other circuit elements required must be kept within fairly narrow value tolerances, thus adding to the expense of the circuit.

SUMMARY OF THE INVENTION

According to the present invention, duty factor correction of an input waveform is accomplished without the necessity of employing a resonant circuit, and without requiring close tolerances on component values. The circuit according to the present invention includes integrating means, suitably comprising a capacitor, adapted to generate a substantially triangular waveform which increases in a given direction during relatively positive portions of the input waveform, and which decreases during relatively negative portions of the input waveform. The triangular waveform is characterized by an average value dividing the triangular waveform into equal time intervals. This triangular waveform is then applied to an output circuit which produces a change in output indication as the triangular waveform crosses its average value. Since average value crossings are evenly spaced, an output waveform is provided having a fifty percent duty factor.

Input means for driving the integrating means, as well as an output circuit for receiving the triangular waveform, desirably comprise limiting means for providing rectangular current waveform outputs. The first limiting means supplies the integrating means, suitably in the form of a capacitor, with current levels for gradually charging and discharging such capacitor. In a preferred form of the invention, the limiting means comprise differential transistor amplifiers which switch current to and from the aforementioned capacitor in synchronous relation with the alternations of the input waveform. A rectangular wave having a substantially fifty percent duty cycle is provided by the output circuit limiting means and is well adapted to drive a balanced modulator or the like.

It is accordingly an object of the present invention to provide an improved duty factor correction circuit which is relatively insensitive to changes in input frequency.

It is another object of the present invention to provide an improved duty factor correction circuit of economical construction which does not have stringent requirements as to component value tolerances.

It is a further object of the present invention to provide an improved duty factor correction circuit and limiting circuit for driving a balanced modulator or the like.

It is another object of the present invention to provide an improved duty factor correction circuit having a constant and predetermined phase shift.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
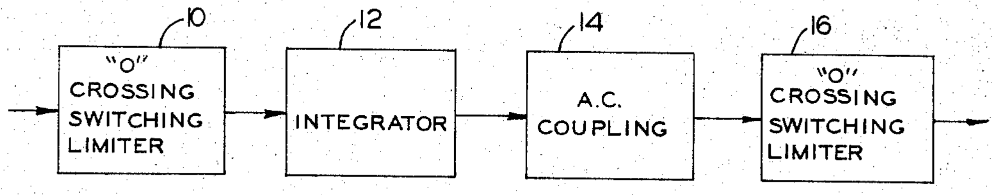
FIG. 1 is a block diagram of the duty factor correction circuit according to the present invention.

Referring to FIG. 1, a duty factor correction circuit according to the present invention comprises a limiter 10 for receiving a distorted, generally unsymmetrical, input waveform. The limiter provides and drives integrator 12 with, a substantially rectangular wave of current which is unsymmetrical in time coincidence with the input waveform. The integrator 12 in turn produces a substantially triangular wave output in response to its rectangular wave input. For example, as long as the rectangular wave output of limiter 10 is positive relative to the rectangular wave zero axis, integrator 12 produces a relatively linear, gradually increasing output. Then, as limiter 10 drives the integrator with a relatively negative portion of the rectangular wave, the integrator 12 output gradually decreases in a relatively linear fashion from the value it therefore reached. The resulting waveform is characterized by an average value which divides the waveform up into substantially equal time intervals.

This triangular waveform is coupled to output limiter 16 by means of a.c. coupling 14. The a.c. coupling applies only the waveform changes to limiter 16, while the d.c. component is blocked. The limiter 16 is arranged to switch and produce a positive output or a negative output, respectively, as its input is driven positively or negatively from the zero axis. As a result of a.c. coupling 14, the average value of the triangular waveform now corresponds to the zero axis of limiter 16, and consequently, limiter 16 switches at equally spaced time intervals. Also, the phase shift produced as a result of the integration is a substantially constant 90°. Moreover, the circuit is substantially insensitive to changes in the frequency of the input signal applied at limiter 10. If the circuit is to be operated primarily at one frequency, the circuit is not critical of individual circuit values, and may therefore be constructed of relatively economical, wide-tolerance components, which do not affect its substantially ideal duty factor correction.

Figure 2:
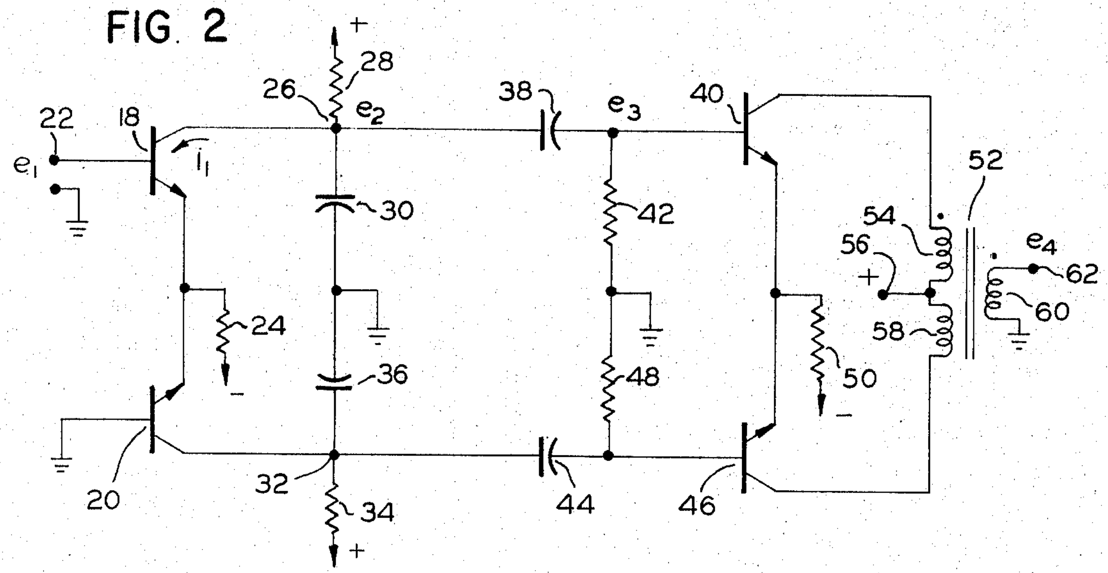
FIG. 2 is a schematic diagram of the duty factor correction circuit according to the present invention.

FIG. 2 is a schematic diagram of a circuit according to the present invention, corresponding approximately to the FIG. 1 block diagram. The circuit is push-pull throughout, although it is understood a single ended arrangement can be employed if desired. The push-pull circuit is advantageous in that temperature coefficients of components tend to balance each other. Also, the transition through the zero axis from one signal polarity to the other is faster in a push-pull circuit, and switching operation is enhanced with particular reference to the output stage.

Referring to the FIG. 2 circuit diagram, a zero crossing switching limiter, heretofore indicated by reference numeral 10 in FIG. 1, advantageously comprises a differentially connected pair of transistors 18 and 20. The base of transistor 18 is connected to input terminal 22, where an input signal voltage, $e_1$, is applied with respect to ground, while the base of transistor 20 is grounded. The emitters of transistors 18 and 20 are connected together and returned to a negative voltage through a relatively large resistor 24. This resistor couples a relatively constant current to one or the other of the transistors according to whether the value of the input voltage $e_1$ is above or below ground. Thus, if the value of $e_1$ is positive with respect to ground, the current in resistor 24 will flow substantially entirely through the collector-emitter path of transistor 18. If, on the other hand, the input $e_1$ is negative with respect to ground, the relatively constant current in resistor 24 will flow substantially entirely through the collector-emitter path of transistor 20. Transistors 18 and 20 thus comprise a current switching pair or a zero crossing switching limiter which switches a relatively constant current, as the input voltage crosses the zero axis.

The collector of transistor 18 is connected to point 26 at the junction between a resistor 28 and capacitor 30, the latter two components being connected in series in that order between a positive voltage and ground. The resistance value of resistor 28 is relatively large and is suitably similar in value to that of resistor 24 so as to appear as a source of relatively constant current. Also, the collector of transistor 20 is connected to point 32 at the midpoint between resistor 34 and capacitor 36 connected serially in that order between a positive voltage and ground. Again, resistor 34 is comparatively large in value. The time constant of the circuit comprising resistor 28 and capacitor 30, or of the circuit comprising resistor 34 and capacitor 36, may be on the order of the period of the input waveform, but is preferably greater. In exemplary circuits according to the present invention, the time constant of the resistor 28-capacitor 30 combination, or of the resistor 34-capacitor 36 combination, was on the order of two to 10 times the period of the input waveform. The circuit involving resistor 24, and either capacitor, has a similar time constant.

Capacitors 30 and 36 together with resistors 28 and 34 form a push-pull integrator corresponding to integrator 12 in FIG. 1. It is again understood that single-ended operation may be provided with only one resistor and capacitor combination, for example, employing only resistor 28 and capacitor 30. In that event, the collector of transistor 20 would be merely coupled to a positive voltage. However, since the differential transistor pair comprising transistors 18 and 20 is advantageously employed as a limiting circuit, the push-pull output obtainable therewith is conveniently utilized as illustrated in FIG. 2.

Capacitors 38 and 44 in FIG. 2, together with resistors 42 and 48 comprise an a.c. coupling circuit corresponding to a.c. coupling 14 in FIG. 1. Capacitor 38 in FIG. 2 couples point 26 to the base of transistor 40, the latter forming a part of an output limiter together with transistor 46. The junction between capacitor 38 and the base of transistor 40 is returned to ground by means of resistor 42 which has a relatively high resistance value. Similarly, point 32 is coupled to the base of transistor 46 by means of capacitor 44, while the junction between capacitor 44 and the base of transistor 46 is returned to ground with relatively large resistor 48. The RC time constants of the resistor-capacitor combinations 38–42 and 44–48 are desirably relatively large as compared to the period of the input signal.

Transistors 40 and 46 are differentially connected in a manner similar to transistors 18 and 20, and form an output limiter circuit or zero crossing switching limiter as referred to by reference numeral 16 in FIG. 1. Resistor 50 in FIG. 2 returns the commonly connected emitters of transistors 40 and 46 to a negative supply point, with resistor 50 being relatively high in value. The output of this limiter is coupled to terminal 62 by way of push-pull transformer 52. The transformer 52 employs closely coupled windings and is adapted to operate in the frequency range of interest for coupling a substantially square wave thereacross, assuming a resistive load or the like is connected between terminal 62 and ground. The collector of transistor 40 is connected to one end of transformer winding 54, the opposite end of which is connected to positive supply terminal 56. Also, the collector of transistor 46 is connected by way of transformer winding 58 to the positive supply terminal 56. Output winding 60 is interposed between output terminal 62 and ground.

The output limiter circuit operates in a substantially similar fashion to the limiter comprising transistors 18 and 20, except that in the case of the output limiter circuit, each of the transistors 40 and 46 receives an input at its base. The circuit of FIG. 2 operates such that the inputs received at the bases of transistors 40 and 46 are one-hundred and eighty degrees out of phase whereby, as transistor 40 turns on, transistor 46 turns off, and vice versa. Consequently, current from resistor 50 is switched either through winding 54, or through winding 58, but not both. Switching occurs, for example, as the base of transistor 40 rises above ground and as the base of transistor 46 simultaneously drops below ground. Windings 54 and 58 are wound in substantially the same direction, and since current flow occurs in opposite directions therethrough according to whether transistor 40 or 46 is conducting, the polarity of output at terminal 62 will change when the transition takes place. If single-ended operation is desired, capacitor 44 and resistor 48 will not be present, and the base of transistor 46 is grounded as is the base of transistor 20. However, a push-pull input is desirable since the triangular waveforms from the integrator vary oppositely in amplitude with variations in input signal duty factor, and the push-pull connection always assures application of a reasonably high amplitude triangular waveform to the output limiter. Moreover the switching action in the output limiter is faster employing a push-pull input therefor.

Figure 3:
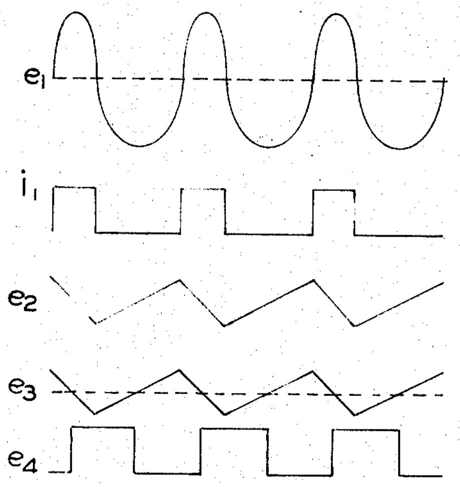
FIG. 3 is a chart of waveforms illustrating operation of the circuit according to the present invention.

Explanation of the operation of the FIG. 2 circuit is advantageously considered with the aid of the FIG. 3 waveform chart, wherein the indicated voltages and currents are plotted on the same time scale in the correct relative position with respect to a common time abscissa. Assume a distorted input waveform $e_1$ is applied between terminal 22 and ground. In general, the input may be any periodic waveform with two a.c. axis crossings per period. During the first half-cycle, or positive-going portion of input waveform $e_1$, transistor 18 will conduct and transistor 20 will not. Substantially all the relatively constant current flowing through resistor 24 will at this time be coupled through the collector-emitter path of transistor 18 and will substantially immediately reach a maximum or limited value in transistor 18 according to the current available. The current level will remain constant at this value until transistor 18 shuts off. During the next half cycle, no current will flow through the same transistor from resistor 24. Therefore, a rectangular wave of current is produced at the collector of transistor 18 in response to the input $e_1$. The current, $i_1$, in the collector of transistor 18 is illustrated in the FIG. 3 waveform chart. The positive-going portion of the rectangular waveform, $i_1$, lasts for the duration of the positive portion of input waveform $e_1$, and the negative-going portion of the rectangular waveform, $i_1$, lasts for the duration of the negative portion of input waveform $e_1$. As soon as input waveform, $e_1$, crosses the zero axis in the negative direction, the current from resistor 24 is switched from transistor 18 to transistor 20, thereby producing the negative-going portion of the rectangular waveform, $i_1$, in FIG. 3.

Triangular waveform, $e_2$, in FIG. 3, is the voltage across capacitor 30. When transistor 18 is nonconducting, the capacitor 30 charges positively, producing a positive-going ramp. The capacitor 30 is charged at this time through resistor 28. When transistor 18 conducts, capacitor 30 discharges through transistor 18 and resistor 24, providing a negative-going ramp portion of triangular waveform. The triangular voltage waveform, $e_2$, developed at point 26 is in general positive with respect to ground, with the remaining terminal of capacitor 30 being grounded. The amplitude and d.c. component of waveform $e_2$ will vary with the duty factor of the input waveform, $e_1$.

The triangular voltage waveform, $e_2$, from point 26 is a.c. coupled by means of an RC coupling network, comprising capacitor 38 and resistor 42, to the base of transistor 40. Normally only the a.c. or changing component of the waveform $e_2$ is coupled to the base of transistor 40. The capacitor 38 will have become charged substantially to the d.c. component of waveform $e_2$. The voltage across capacitor 38 can change only very slightly in the short time of the period of the input waveform, assuming the time constant of the capacitor 38, resistor 48 combination is relatively long in comparison therewith. Thus, the changing signal voltage, $e_3$, at the right hand terminal of capacitor 38 will be essentially the same as the changing signal voltage appearing at point 26, but the d.c. component will be absent. The average value of the triangular waveform at the base of transistor 40 will then be substantially coincident with a ground level or zero axis in the output limiter circuit. The waveform, $e_3$, at the base of transistor 40, is illustrated in FIG. 3 with respect to ground level, the latter being indicated by the dashed line. The average value of the triangular waveform divides such waveform into equal time intervals, and since this average value is now coincident with the zero crossing switching point of the output limiter circuit, the output limiter circuit will now switch at equally spaced intervals. Thus, as the triangular waveform, $e_3$, crosses the zero axis in the positive direction, transistor 40 turns on and transistor 46 turns off. Then, as the triangular waveform, $e_3$, crosses the zero axis in the negative direction, the opposite switching action takes place. As a consequence, waveform $e_4$, illustrated in FIG. 3, is produced at output terminal 62, this substantially rectangular wave going positive and negative in substantial coincidence with the positive and negative zero axis crossings of waveform $e_3$. Waveform $e_4$, having positive and negative portions of equal duration and therefore having a 50 percent duty factor, is suitably applied to operate a balanced modulator, synchronous detector, or the like, for producing accurately timed operation of the same.

Of course, waveform $e_4$ has precisely the same frequency as the input waveform $e_1$, and it should also be observed that waveform $e_4$ is displaced ninety degrees in phase from waveform $e_1$. This phase difference remains constant regardless of the frequency of the input waveform, and does not vary with frequency as would be the case in a duty cycle or duty factor correction circuit relaying upon an LC resonant combination. Although the above explanation has been given with particular attention to the upper or positive portion of the FIG. 2 circuit, it is understood that the lower portion of the circuit operates in the same manner with the waveform excursions being one-hundred and eighty degrees out of phase in the lower portion.

In a particular instance, the FIG. 2 circuit has been utilized for duty factor correction of a television color subcarrier signal, $e_1$, having a frequency of approximately 3.58 megacycles. In this instance, the various resistors and capacitors had the following values, to be taken by way of example and not by way of limitation:

$R_{24}$ — 3,000 ohms
$R_{28}$ and $R_{34}$ — 3,600 ohms
$C_{30}$, $C_{36}$, $C_{38}$, and $C_{44}$ — 270 picofarads
$R_{42}$ and $R_{48}$ — 2,000 ohms
$R_{50}$ — 1,000 ohms Although the color subcarrier frequency will not vary greatly, nevertheless, the circuit components need not have close tolerances, and hence may be inexpensive. In prior art apparatus employing LC tuned circuits for a duty cycle correction, the LC circuits and attendant components would have to be designed for the particular frequency of operation.

A circuit as thus described for normal operation at approximately 3.58 megacycles will also be found to operate quite satisfactorily over a wide frequency range of from three to six megacycles, for example. The phase shift does not drift but remains constant at ninety degrees regardless of the frequency of operation. In addition, the circuit need not be adjusted as the frequency is changed.

Although transistors are preferred in the circuit according to the present invention, other active switching devices such as vacuum tubes or the like may be alternatively employed.

While I have shown and described preferred embodiments of my invention, it will be apparent to those skilled in the art that many other changes and modifications may be made without departing from my invention in its broader aspects.

I claim:

1. A circuit for providing duty factor correction with respect to an assymetrical input signal requiring same, said signal having relatively positive-going and relatively negative-going portions of unequal duration, said circuit comprising:

limiting means receiving said assymetrical input signal for providing a substantially rectangular assymetrical current waveform by limiting the amplitude of said input signal, said rectangular current waveform having relatively positive-going and negative-going excursions, integrating means responsive to said current waveform positive-going portions for producing an integral output increasing in a first sense, and responsive to said current waveform negative-going portions for causing said integral output to decrease in the first sense, to produce a triangular waveform, and output means responsive to said triangular waveform for producing an output of a first relative polarity when the triangular waveform as received by the output means is above a predetermined reference value while producing an output of a second relative polarity when said triangular wave as received by the output means is below said predetermined reference value, said circuit including d.c. blocking alternating current coupling means for coupling said triangular wave-form as the input to said output means with the average value thereof coincident with said predetermined reference value.

2. The circuit according to claim 1 wherein said integrating means comprises capacitor means, said limiting means including means for providing a relatively constant current in a first direction relative to said capacitor means during said relatively positive-going portions of the input signal and for providing a relatively constant current in a second direction relative to said capacitor means during said relatively negative-going portions of the input signal.

3. The circuit according to claim 1 wherein said alternating current coupling means comprises a capacitor.

4. A circuit for providing duty factor correction with respect to an assymetrical input signal requiring same, said signal having two a.c. axis crossings per period, said circuit comprising:

first limiting means receiving said assymetrical input signal for providing a substantially rectangular assymetrical current waveform by limiting the amplitude of said input signal, said rectangular current waveform having relatively positive-going and negative-going excursions of current above and below a predetermined reference value, integrating means for receiving said rectangular current waveform and providing a substantially triangular waveform in response to said rectangular current waveform, said integrating means having a time constant at least substantially as long as the period of said input signal, said triangular waveform having an average value dividing said triangular waveform into substantially equal time intervals, second limiting means responsive to the triangular waveform for providing a substantially rectangular output wave, as the input applied to such second limiting means varies above and below a predetermined reference value, and d.c. blocking alternating current coupling means for applying said triangular waveform to the second limiting means to provide said input varying with respect to said last mentioned predetermined reference value, said triangular waveform as thus applied to said second limiting means having substantially equal time intervals above and below the last mentioned reference value for producing a 50 percent duty factor output wave.

5. The circuit according to claim 4 wherein said integrating means includes a first capacitor.

6. The circuit according to claim 5 wherein said alternating current coupling means comprises a second capacitor.

7. The circuit according to claim 6 wherein said first limiting means includes an active switching device having its output terminal connected to said first capacitor, said circuit further including a resistor connected in charging relation to said first capacitor.

8. A circuit for providing duty factor correction with respect to an assymetrical input signal, said signal having two a.c. axis crossings per period, said circuit comprising, first limiting means receiving said assymetrical input signal for providing a substantially rectangular assymetrical current waveform by limiting the amplitude of said input signal, said rectangular current waveform having relatively positive-going and negative-going excursions of current above and below a predetermined reference value, integrating means for receiving said rectangular current waveform and providing a substantially triangular waveform in response to said rectangular current waveform, said integrating means having a time constant at least substantially as long as the period of said input signal, said integrating means including a first capacitor, said triangular waveform having an average value dividing said triangular waveform into substantially equal time intervals, second limiting means responsive to the triangular waveform for providing a substantially rectangular output wave, as the input applied to such second limiting means varies above and below a predetermined reference value, and alternating current coupling means for applying said triangular waveform to the second limiting means to provide said input varying with respect to said last mentioned predetermined reference value, said alternating coupling means comprising a second capacitor, said triangular waveform as thus applied to said second limiting means having substantially equal time intervals above and below the last mentioned reference value for producing a fifty percent duty factor output wave, said first limiting means comprising a pair of active current switching devices, one output of which is connected to the first capacitor, said pair of current switching devices being connected to switch current from one to the other when said input waveform reaches a predetermined value.

9. The circuit according to claim 8 wherein said current switching devices comprise differentially connected transistors having a common current source emitter resistor for returning the transistor emitters to a reference point.

10. A circuit for providing duty factor correction with respect to an assymetrical input signal, said signal having two a.c. axis crossings per period, said circuit comprising:

first limiting means receiving said assymetrical input signal for providing a substantially rectangular assymetrical current waveform by limiting the amplitude of said input signal, said rectangular current waveform having relatively positive-going and negative-going excursions of current above and below a predetermined reference value, integrating means for receiving said rectangular current waveform and providing a substantially triangular waveform in response to said rectangular current waveform, said integrating means having a time constant at least substantially as long as the period of said input signal, said triangular waveform having an average value dividing said triangular waveform into substantially equal time intervals, second limiting means responsive to the triangular waveform for providing a substantially rectangular output wave, as the input applied to such second limiting means varies above and below a predetermined reference value, said second limiting means comprising a pair of current switching devices connected to switch current from one to the other when said triangular waveform as applied to said second limiting means reaches said last mentioned predetermined reference value, and alternating current coupling means for applying said triangular waveform to the second limiting means to provide said input varying with respect to said last mentioned predetermined reference value, said triangular waveform as thus applied to said second limiting means having substantially equal time intervals above and below the last mentioned reference value for producing a 50 percent duty factor output wave.

11. The circuit according to claim 10 wherein said second limiting means comprises a differentially connected pair of transistors having a common emitter resistor returned to a reference point.

12. A circuit for providing duty factor correction with respect to an assymetrical input signal, said signal having two a.c. axis crossings per period, said circuit comprising:

first limiting means receiving said assymetrical input signal for providing a substantially rectangular assymetrical current waveform by limiting the amplitude of said input signal, said first limiting means comprising a first differential pair of devices for switching current, said rectangular current waveform having relatively positive-going and negative-going excursions of current above and below a predetermined reference value, integrating means for receiving said rectangular current waveform and providing a substantially triangular waveform in response to said rectangular current waveform, said integrating means having a time constant at least substantially as long as the period of said input signal, said integrating means comprising a pair of capacitors connected respectively to output electrodes of said devices of said first differential pair, said triangular waveform having an average value dividing said triangular waveform into substantially equal time intervals, second limiting means responsive to the triangular waveform for providing a substantially rectangular output wave, as the input applied to such second limiting means varies above and below a predetermined reference value, said second limiting means comprising a second differential pair of switching devices, and alternating current coupling means for applying said triangular waveform to the second limiting means to provide said input varying with respect to said last mentioned predetermined reference value, wherein said alternating current coupling means comprises RC coupling circuits connecting the said capacitors to respective inputs of the second pair of switching devices, said triangular waveform as thus applied to said second limiting means having substantially equal time intervals above and below the last mentioned reference value for producing a 50 percent duty factor output wave.

13. The circuit according to claim 12 wherein said integrating means further includes a pair of resistors connected respectively in charging relation to said capacitors.

14. The circuit according to claim 12 wherein said switching devices comprise transistors.

15. The circuit according to claim 14 wherein each pair of differentially connected transistors is provided with common emitter current source means.

* * * * *